Figure 1B:
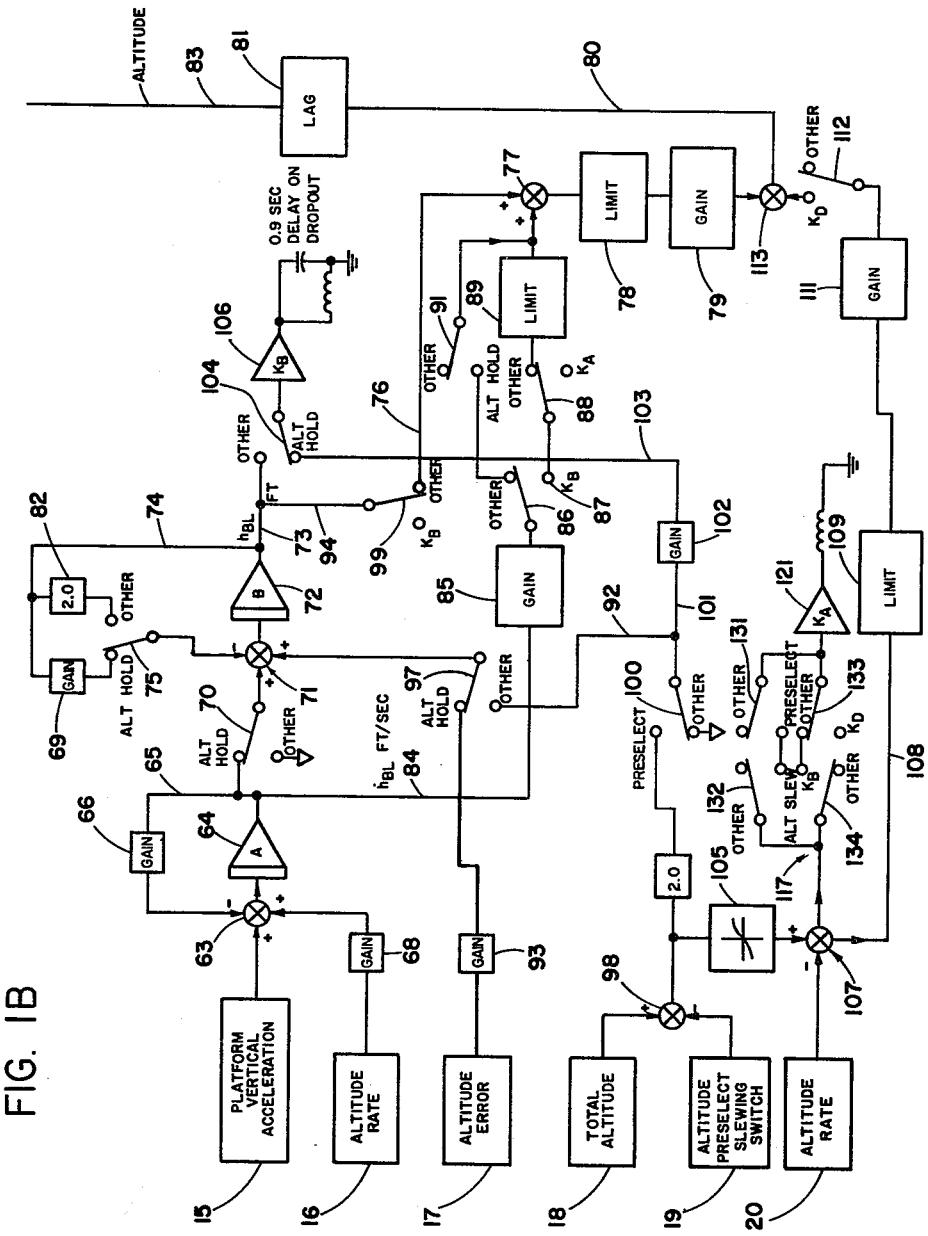

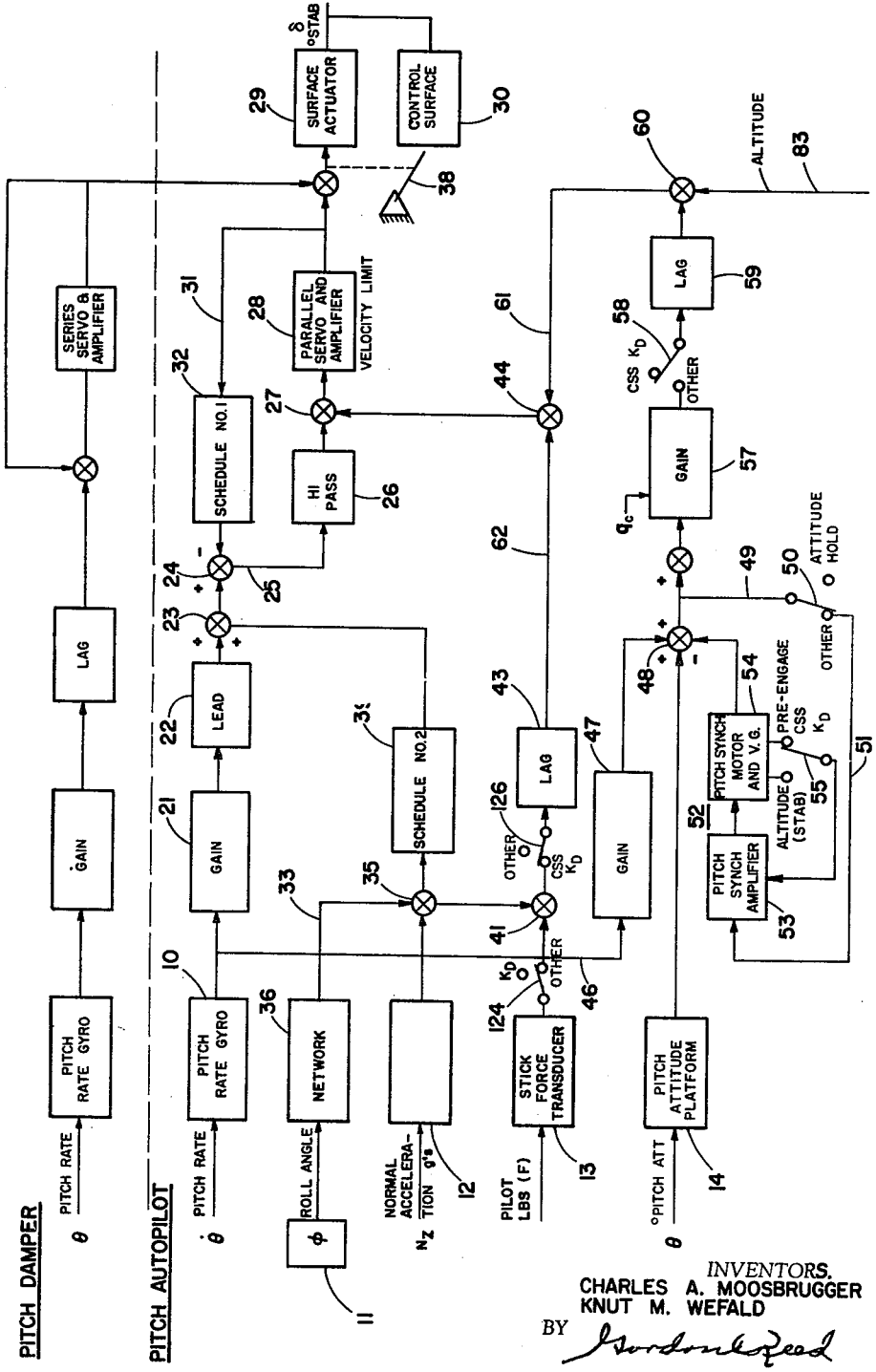

INVENTORS.
CHARLES A. MOOSBRUGGER
KNUT M. WEFALD
BY

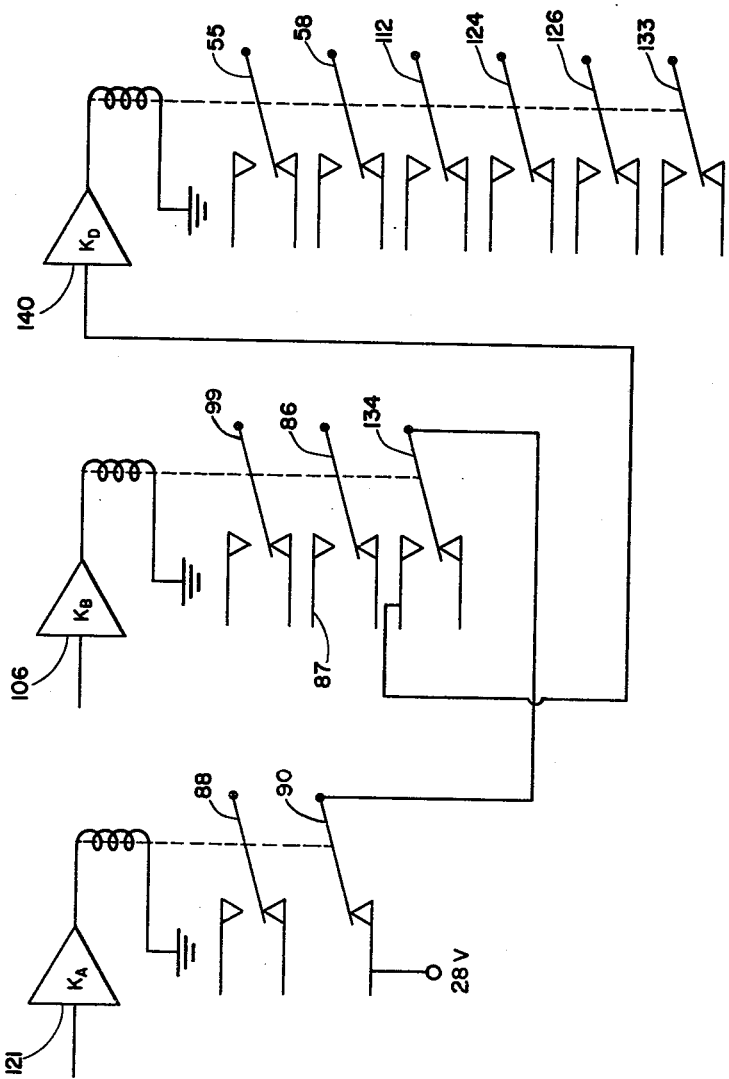

United States Patent Office 3,167,276
Patented Jan. 26, 1965

3,167,276
CONTROL APPARATUS
Charles A. Moosbrugger, Columbia Heights, and Knut M. Wefald, St. Louis Park, Minn., assignors to Honeywell Inc., a corporation of Delaware
Filed Sept. 29, 1961, Ser. No. 141,911
10 Claims. (Cl. 244—77)

This invention relates generally to condition control apparatus and more in particular to condition control apparatus applicable to the control of a dirigible craft operable in a medium, such as aircraft.

The present invention is herein illustrated and described as applied in the control of a conventional aircraft utilizing elevator surfaces for controlling or changing the pitch attitude thereof. However, it will be appreciated that the control apparatus herein disclosed may be applied to other types of craft utilizing means other than the control surfaces mentioned for effecting attitude changes.

One object of the invention is to provide a novel apparatus for control of a craft, operable in a medium supporting the body, in a vertical plane in dependence of the vertical rate of motion of the craft and position of the craft with reference to a given position.

A further object of this invention is to preselect the reference position of the craft, and on approach of the craft to such selected position attain such selected position through a command maneuver.

A further object of this invention is to select a desired position for the craft to attain and approach such selected position at a given attitude but to modify such attitude when the altitude rate and the difference between the selected and present or actual position of the craft are equal.

A further object of this invention is to automatically apply an altitude hold control to the apparatus when the difference between the selected altitude and actual altitude is zero.

The above statements are illustrative of the aims and objects of this invention; other objects and advantages thereof will become apparent upon a study of the following specification when considered in conjunction with the accompanying drawings in which:

FIGURES 1A and 1B show in block form the invention applied to a combined pitch damper and pitch autopilot for the control of an aircraft about its pitch axis; and FIGURE 2 shows switching relays utilized in FIGURES 1A and 1B.

While various control modes may be provided in an automatic pilot for an aircraft, the present invention pertains to a preselect altitude control mode which the pilot may select to assist in controlling the aircraft and to thus provide an automatic outer loop control. The altitude preselect mode may be engaged by the pilot of the aircraft at any time following autopilot engagement. The desired altitude is selected by means of a slewing switch arrangement conveniently located for the pilot. Climbs or descents to the preselected altitude will be initiated by the pilot of the aircraft using the stick force transducer on the conventional aircraft control stick. Through the stick force transducer the pilot would choose the desirable climb or descent attitude in accordance with the tactical situation.

As the preselected altitude is approached, the autopilot will control the aircraft through the pitch axis by a round-out operation involving operation of the aircraft elevator surface so that a smooth level-off maneuver to the preselected altitude is realized. Maneuvering load factors may preferably be controlled to predetermined g's such as 0.5 g's during such leveling off. At the preselected altitude, altitude hold control will be applied to the aircraft through the automatic pilot.

Repeating in summary, this invention is primarily concerned with the flight of an aircraft from a present altitude to a preselected altitude which flight may be initially made at a selected attitude. A rounding out of the flight of the aircraft from the selected attitude to the level of preselected altitude is effected when the altitude rate is equal and opposite to a function of the difference between the preselected altitude and the actual altitude of the aircraft. When thereafter the preselected altitude is equal and opposite to the actual altitude of the craft, the rounding out portion is terminated and the aircraft altitude hold mode is applied.

In FIGURES 1A and 1B illustrating the invention, various aircraft condition sensing devices are utilized in the pitch autopilot to operate signal sources which in the present instance for example may be D.C. voltage signal sources. The sensing devices which are old in the art appear in the left side of the figures and beginning with the upper left in FIGURE 1A there is provided a pitch rate gyro 10 for sensing craft pitch rate, a roll angle sensing device 11, a normal acceleration sensor 12, a stick force transducer 13, a pitch attitude device 14, a vertical acceleration sensing device 15, an altitude rate signal source 16 similar to device 146 of Patent 2,944,768, an altitude error signal source 17 similar to device 135 of Patent 2,944,768, a total altitude signal source 18 corresponding with device 15 of Patent 2,678,178, a preselect altitude signal source 19 corresponding with device 3 of Patent 2,678,178, and an altitude rate signal source 20 corresponding with device 16 above.

The apparatus to which the invention has been applied or wherein it is embodied is used in the control of an aircraft about its pitch axis. The apparatus for illustration utilizes D.C. voltage control signals as well as gain devices and gain scheduling devices along with various conventional networks such as lag and high-pass networks. However, inasmuch as D.C. signals and scheduling as well as the various networks are old in Weber 2,944,768 where they are shown in detail they will be illustrated herein merely in block form.

Returning to FIGURES 1A and 1B and restricting attention to the pitch autopilot of the control apparatus, the pitch rate gyro 10 supplies the D.C. signal to a gain device 21 from which the modified signal is transmitted to a lead network 22 and thence to a signal summing arrangement or electrical differential 23. The output of summing arrangement 23 is supplied to a second summing arrangement 24 having its output supplied through transmission means 25 to a high-pass network 26 and thence to a third summing arrangement 27. The output of summing arrangement 27 is used to control an amplifier-parallel servo combination 28 which positions a control valve (not shown) of a fluid type surface actuator 29. Actuator 29 operates a control surface 30 which may be the elevator surface of the craft. The displacement of the parallel servo also supplies a feedback signal through transmission means 31 and through a scheduling device 32, adjusted in accordance with "$q$," to the summing arrangement 24.

The servomotor 28 may be of the type disclosed in Patent 2,960,284 to Perkins, see FIGURE 4. It may be noted that such servomotor in Perkins includes a pilot valve. When such pilot valve is in the inoperative position, the control valve of the surface actuator 29 may be operated from a conventional pilot control stick 38 without substantial resistance by the parallel servomotor 28.

The roll attitude sensing device 11 provides a signal voltage in accordance with roll attitude of the craft to a function network 36 which modifies the signal in accordance with the expression secant $\phi-1$. The modified signal is transmitted by conductor 33 to a fourth summing device 35 which also receives a normal acceleration signal voltage proportional to the acceleration of the craft in the direction of its vertical axis which is perpendicular to the pitch axis of the craft from sensing device 12. The output of the summing arrangement 35 in one instance is applied through a gain scheduling device 39 to the first summing arrangement 23. The output of summing arrangement 35 is also applied to a fifth summing arrangement 41 which receives the signal voltage in accordance with the stick force applied by the pilot of the aircraft through a lag network 43 to a sixth summing arrangearrangement 41 is applied through arm 126 as shown and through a lag network 43 to a sixth summing arrangement 44 from which it is supplied to the third summing arrangement 27.

The pitch rate signal from rate gyro 10 is also supplied by means of transmission means 46 to a gain device 47 and thence to a seventh summing arrangement 48 where it is summed with the aircraft pitch attitude signal voltage from sensing device 14. The output of summing arrangement 48, in one instance, is supplied through a "$q$" scheduler 57 and switching arrangement 58 in the "other" position and thence through a lag network 59 to an eighth summing arrangement or electrical differential 60 which through transmission means 61 supplies its output to sixth summing arrangement 44. In the above, the quantity "$q$" is the conventional dynamic pressure which may be scheduled by various means, see Owen 2,829,847, device 65, FIGURE 1 or as in Weber 2,944,768, FIGURE 1A device 34.

The output of seventh summing arrangement 48 is also supplied through transmission means 49 (in several control modes), switching arrangement 50, and transmission means 51 to the input of a conventional pitch synchronizer 52 having an amplifier 53 receiving the input and which controls a motor-velocity signal generator combination 54 that operates a D.C. energized potentiometer for example to provide an output signal to summing arrangement 48 that is equal and opposite to the pitch attitude and pitch rate signal supplied to arrangement 48 whereupon the operation of motor 54 terminates. Summing arrangement 48 is thus balanced for application subsequently of autopilot control without a "bump" from devices 10 and 14. The motor arrangement 54 includes a switching arrangement 55 which provides for rapid or slow operation of motor 54.

The invention is concerned primarily with altitude preselect and altitude hold features which coact with the above described autopilot apparatus. The description which follows provides altitude control signals as well as switching arrangements controlled by altitude signals for the autopilot and is thus more intimately related to the invention.

The sensors of FIGURE 1B primarily provide the round-out portion of the preselected altitude maneuver which is followed by an altitude hold mode. The control signals during such subsequent altitude hold mode are a combination of blended altitude rate and altitude error. The provision of a blended altitude rate signal derived from craft vertical acceleration as sensed by device 15 and craft altitude rate as sensed by device 16 herein has been heretofore provided in an application of John C. Larson, Serial No. 855,636 filed November 27, 1959 now Patent 3,035,795 and thus was not initially provided herein. In the arrangement, the vertical acceleration signal from device 15 is summed with an altitude rate signal from device 16 modified by a gain device 68, the summing being provided by a ninth summing arrangement 63 which has its output supplied to an integrator 64 having a transfer function typically of $1/S$. The ouput from the integrator 64 is fed through a feedback gain device 66 having the same magnitude as gain device 68 consequently a blended altitude rate signal $\dot{h}$ is provided on the output of the integrator 64 and supplied to a switching device 70.

A blended altitude error $h$ is derived from the altitude error and blended altitude rate $\dot{h}$. For this purpose the altitude error obtained on altitude error sensing device 17 is applied through a gain device 93 and a switching arrangement 97 to a tenth summing arrangement 71 which receives the blended altitude rate signal from switching device 70. The output of the summing arrangement 71 is applied to an integrator 72 having typically the transfer function $1/S$, where S is the Laplace operator. The output of integrator 72 is supplied through feedback transmission means 74, gain device 69 and switching arrangement 75 to the tenth summing arrangement of signal combining means 71 so that the output of integrator 72 on transmission means 73 is a blended altitude error signal $h$.

Leaving for the time being the blended altitude rate and blended altitude error signals, the following description of the remaining sensors vertically arranged in FIGURE 1B pertains to the altitude preselect switching arrangement and circuitry utilized prior to the altitude hold mode.

An altitude sensing device 18 for measuring total altitude provides a signal to an eleventh summing or signal combining device 98 which has a second signal supplied thereto in accordance with the preselected altitude, the second signal being of opposite sign to the first. The preselected altitude signal may be derived for example from a motor operated potentiometer in which the motor thereof is controlled by a switch which is closed to operate the motor and when the desired signal is obtained from the potentiometer the motor circuit is opened. The output from summing device 98 is supplied in one instance through a preselect switch 100, transmission means 92, switch 97, summing means 71, amplifier 72, switching arrangement 104, to an amplifier 106 that energizes a $K_B$ relay.

In addition summing device 98 has its output supplied through a function generator 105 as linear to square root, and thence to a twelfth summing device 107 which also receives an altitude rate signal from device 20. The output of summing device 107 is applied through a switching arrangement 117 to an amplifier 121 that controls a $K_A$ relay.

The output of twelfth summing device 107 also is supplied by transmitting means 108 to a voltage limiter 109 having the output therefrom supplied through gain device 111 to switching arrangement 112. Switching arrangement 112 supplies the signal voltage which is $\sqrt{\text{total altitude}-\text{altitude preselect}}-\text{altitude rate}$ to a thirteenth summing arrangement 113 from whence the signal travels through transmission means 80, lag network 81, conductor transmission means 83 to summing arrangement 60 connected to the amplifier-parallel servo 28 to provide a control signal.

The switching arrangement 117 comprises a two-position switch arm 131 movable like switch 100 into a "preselect" position when applying preselected altitude control; an altitude slewing switch arm 132 movable momentarily or temporarily to an altitude slew position during operation of the above motor operated preselect potentiometer; a switch arm 133 operated by a $K_D$ relay, to be described, to a "$K_D$" position; and an arm 134 operable by a "$K_B$" position.

Operation

The operation of the pitch autopilot apparatus will be considered in two modes, the first being the attitude control mode and the second being the altitude control mode. Since the invention is involved in changing the aircraft from a present to a preselected altitude, an attitude must be given to the craft such that it will cause the craft to change altitude. With the automatic pilot engaged and fluid pressure applied to the parallel fluid operated servo 28, the control attitude may be selected by the pilot operating the stick force transducer 13. The voltage signal output of the transducer 13 is supplied through switch arms 124, 126, as shown, transmission means 62 and signal summing arrangements 44, 27 to the parallel amplifier-servo arrangement 28. The operation of the servo 28 through the actuator 29 positions the control surface 30 to effect a change in craft pitch attitude. During this change in pitch attitude while under the pilot operated control stick force transducer 13, the output of the pitch attitude sensing device 14, FIGURE 1A, is supplied through transmission means 49, switch arm 50 in the position shown, transmission means 51 to the pitch synchronizer amplifier 53 that controls the pitch synchronizer motor 54 to develop a signal balancing summing arrangement 48 and thus the input to the pitch synchronizer amplifier 53 while no signal is supplied through gain scheduler 57 and lag network 59 to summing arrangement 60 to control the craft attitude.

With the aircraft thereby placed in a climb or attitude other than level to effect a change in altitude, the pilot operates the slewing switch arrangement (19, 132) to preselect a desired altitude and provide a preselect altitude signal. Such preselected altitude may be displayed by a conventional indicator. The preselect altitude signal is algebraically summed with the aircraft total altitude signal from device 18 at summing arrangement 98 and upon a difference in the two voltage signals a voltage is applied through switch arm 100 in the preselect position, transmission means 92, arm 97 in the "other" position, summing arrangement 71, amplifier 72, switch 104 in the "other" position, to the amplifier 106 which energizes the $K_B$ relay causing it to operate its three contact arms 86, 99, 134, FIGURE 2, in the "in" or operated position to withhold the round-out maneuver. The energization of the $K_B$ relay operates relay arm 99 to prevent the transmission of a blended altitude signal to transmission means 76; operates the relay arm 86 to force the blended altitude rate signal $\dot{h}_{BL}$ to pass through the limiter 89 to the summing device 77; and operates the relay arm 134 to the opposite position from that shown to conditionally energize $K_A$.

Additionally, the output of the summing arrangement 98 after pasage to function generator 105 is combined with the craft altitude rate signal at summing arrangement 107 having the output thereof supplied through now operated relay contact arm 134, unoperated relay arm 133, to amplifier 121 of the $K_A$ relay which closes or operates arm 88 thereof to withhold the altitude hold control.

In addition to the $K_A$ relay which has two operable contact arms 88, 90 and the $K_B$ relay which has three contact arms there is a third or $K_D$ relay which has six contact arms 55, 58, 112, 124, 126, 133, FIGURE 2. The $K_D$ relay is energized through an out-contact of the $K_A$ relay, arm 90 thereof and an in contact of the $K_B$ relay through a suitable amplifier 140 and 28-volt supply line.

The aircraft under the stick force signal will change its altitude at the selected attitude. When the output of summing arrangement 98 is equal and opposite to the altitude rate from device 20 at the summing arrangement 107, there is zero control signal on the amplifier 121, and the $K_A$ relay drops to the out or unoperated position. Since the $K_B$ relay is still in the in or operated position, the $K_D$ relay is energized at this time through arms 90 and 134, FIGURE 2.

The aircraft begins the round-out portion of its flight at the instant the $K_D$ relay is energized as will be described. The energized $K_D$ relay operates relay arm 133 to break the circuit to relay amplifier 121. Relay switch arm 112, lower right FIGURE 1B, is operated to apply an altitude control signal from summing device 107 into the control channel of the pitch autopilot through thirteenth summing arrangement 113 and transmission means 80. Relay arm 126 is moved to the closed position permitting a normal acceleration signal from device 12 to be supplied through summing arrangement 41, lag device 43, transmission means 62, summing device 44 into the control channel of the autopilot to control the normal acceleration during the attitude round-out portion of the flight. Relay arm 124 is moved to the operated position to prevent any stick force signal from being applied to the control channel of the autopilot. Relay arm 58 is moved to the operated position to prevent application of the pitch attitude signal from device 14 to the summing arrangement 60. Relay arm 55 is operated to alter the operation rate of the synchronizer motor 54.

When the preselect altitude signal is equal and opposite to the total altitude signal on signal summing arrangement 98, the signal on amplifier 106 of the $K_B$ relay is reduced to zero and the $K_B$ relay drops to its out position. At this time "altitude hold" is applied and arms 70, 75, 91, 97, 104 thus positioned and an altitude error signal is provided by device 17 upon change from the preselected altitude which may be coupled to the autopilot on dropout of the $K_B$ relay, such as by energizing a clutch winding similar to winding 159 of the altitude sensor 135 of the patent to Weber, 2,994,768 FIGURE 1A. With the $K_B$ relay deenergized, the $K_D$ relay is also deenergized, so that altitude control signal from device 107 no longer is supplied through relay arm 112 to the elevator control channel. Relay arm 133 moves to the "other" position for any subsequent change in preselected altitude. Relay arm 126 is moved to the "other" position to eliminate the normal acceleration signal from sensor 12 to the autopilot control channel through rate network 43. Relay arm 124 moves to the "other" position for subsequent control stick steering signals. Relay arm 58 moves to the "other" position to supply lagged pitch rate and pitch attitude signals to the elevator control channel. Relay arm 55 is moved to the "altitude" stab position.

The stick force transducer 13 is released by the pilot at the predetermined altitude and arm 50 is moved to the attitude hold position.

Thus after the round-out maneuver with the $K_B$ and $K_D$ relays as well as the $K_A$ relay deenergized a blended altitude displacement signal $h_{BL}$ from transmission means 73 is supplied through relay arm 99 and the "other" contact to summing arrangement 77 and thence into the control channel for the elevator surface. A blended altitude rate signal $\dot{h}_{BL}$ from transmission means 84 is supplied through gain arrangement 85, switch arm 86 in the "other" position, switch 91 in "altitude hold" to summing arrangement 77 and thence into the elevator control channel to apply altitude hold control.

Upon subsequent selection of a new altitude by means of the slewing switches with reference to the altitude preselect indicator, the autopilot will revert to the attitude hold mode and automatic leveling off and control to the preselected altitude will be accomplished as the new altitude is achieved.

Briefly repeating the operation, the pilot engages altitude preselect which will energize relays $K_A$ and $K_B$ if an altitude error that is (preselect — present altitude) exists. Relay $K_A$ monitors the algebraic sum of altitude rate plus a function of (total altitude — preselect altitude). When this sum goes to zero relay $K_A$ is deenergized and a selected "g" round-out maneuver to level flight is commenced. This selected "g" round-out is obtained by commanding normal acceleration with an altitude rate signal. The altitude rate signal is limited to a selected feet-per-second which is equivalent to the selected "g" during round-out. During an ideal round-out maneuver the algebraic sum of altitude rate plus the function of (total altitude — preselect altitude) is maintained at zero. If this sum differs from zero, the difference is used to vary by up to plus or minus selected "g" maximum the selected "g" commanded in order to correct for deviations from the desired flight path. When the altitude error (total altitude — altitude preselect) goes to zero relay $k_B$ is deenergized and the appropriate switch arms assume the altitude hold position and thus the autopilot goes to the altitude hold mode.

It will now be apparent that there has been provided a novel altitude preselect and altitude round-out arrangement in which the round-out is effected at a desired "g"-load on the aircraft.

Although but one embodiment of the invention has been illustrated and described in detail herein, it is to be expressly understood that the invention is not limited thereto. Thus various changes can be made in the design and arrangement of the parts without departing from the spirit and scope of the invention as the same will now be understood by those skilled in the art.

What is claimed is:

1. In control apparatus for a dirigible craft having attitude changing means comprising: means providing a position error first signal varying with the difference of the present position of the craft and a desired position; means providing a position change rate second signal varying with the rate of change of the present position of the craft; a first and second signal transmission means each having an operated and unoperated condition; means operating the second transmission means from the first signal; means operating the first transmission means from the first and second signals in opposition; further means transmitting a command signal and position rate signal through the first and second signal transmission means to said attitude changing means when the first transmission means is in unoperated condition and additional means for transmitting a position error signal and position error rate signal to said attitude changing means when the second transmission means is in unoperated condition.

2. In control apparatus having condition changing means: means controlling said condition changing means in accordance with a sum of a command signal and a condition rate signal when a selected condition error and the condition rate signals are equal in magnitude but opposite in polarity, and further controlling said condition changing means when the selected condition error signal is zero, from a condition hold error signal and a condition rate signal.

3. In control apparatus having condition changing means in combination: means providing a selected condition error signal; means providing a condition error rate signal; means operating said condition changing means in accordance with a sum of a maneuvering command signal and a condition rate signal when the error rate signal is equal and opposite to the selected condition error signal; and alternative means subsequently controlling said condition changing means by a sum of said error rate signal and a condition stabilizing error signal when the selected condition error signal is zero.

4. In control apparatus for an aircraft having pitch attitude changing means, in combination: operable means controlling said attitude changing means to alter attitude and thus change altitude; means providing a first signal in accordance with the error between the total altitude of an aircraft and a preselected altitude; means providing a second signal in accordance with the altitude rate of the craft; further means combining said first and second signals in opposition; and additional means controlled by said further means when said two signals are equal and opposite rendering the operable means in- effective and controlling operation of the attitude changing means by said two signals thereby effecting a round-out or leveling off of the flight path of the aircraft.

5. The apparatus of claim 4, auxiliary means controlled by said first signal and effective on reduction thereof to zero magnitude operating said attitude changing means to maintain the altitude of the craft at the selected magnitude.

6. The apparatus of claim 1, and additional means controlling the attitude changing means whereby the attitude of the aircraft is altered to decrease said first signal.

7. Control apparatus for a dirigible craft having pitch attitude changing means comprising: means providing a first error signal varying with the present height of the craft and a desired height of the craft; means providing a height change rate second signal varying with the rate of change of the present height of the craft; a first and a second signal transmission means; means operating the second transmission means from the first signal; means operating the first transmission means from both the first and second signals in opposition; further means transmitting a maneuvering signal and height change rate signal through the first and second signal transmission means to said attitude changing means when the first and second signals are equal and opposite; and additional means transmitting a height hold error signal and height error rate signal to said attitude changing means when the first signal is reduced to zero.

8. In a craft having pitch attitude changing means, means for preselecting a desired height for the craft and thereafter maintaining the craft at such height comprising: means for providing a signal in accordance with the actual height of the craft; means providing a signal in accordance with a desired height of the craft; means providing a third signal in accordance with the rate of change of height of the craft; means operating the attitude changing means to alter the attitude of the craft; means responsive to said first and second signals; additional means responsive to said first, second and third signals; means controlled by the further means on the signals applied thereto being zero causing a maneuvering signal to be applied to the attitude changing means; and auxiliary means effective when the sum of the first and second signals equals zero controlling the attitude changing means to maintain the preselected height.

9. In condition control apparatus having condition changing means, in combination: means providing a first error signal in accordance with the difference between a selected condition and a present condition; means providing a second signal in accordance with the rate of change of condition; means operating said condition changing means from a third signal when the first signal is equal and opposite to the second signal; and alternative means subsequently controlling said condition changing means from a condition stabilizing error signal when the first error signal is zero.

10. The apparatus of claim 4 wherein the additional means includes provisions that the round-out is effected at a selected "g" magnitude.

References Cited in the file of this patent

UNITED STATES PATENTS

| | | |
|---|---|---|
| 2,507,304 | Hofstadter | May 9, 1950 |
| 2,841,345 | Halpert | July 1, 1958 |
| 2,945,649 | Metcalf | July 19, 1960 |